US008443588B2

(12) United States Patent
Nishikiori et al.

(10) Patent No.: US 8,443,588 B2
(45) Date of Patent: May 21, 2013

(54) CONTROL APPARATUS FOR INTERNAL COMBUSTION ENGINE

(75) Inventors: Takashi Nishikiori, Susono (JP); Norihisa Nakagawa, Numazu (JP); Koichi Hoshi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 36 days.

(21) Appl. No.: 13/257,316

(22) PCT Filed: Jan. 18, 2010

(86) PCT No.: PCT/JP2010/050510
§ 371 (c)(1),
(2), (4) Date: Sep. 19, 2011

(87) PCT Pub. No.: WO2011/086704
PCT Pub. Date: Jul. 21, 2011

(65) Prior Publication Data
US 2012/0006291 A1  Jan. 12, 2012

(51) Int. Cl.
*F01N 3/00* (2006.01)

(52) U.S. Cl.
USPC ............ 60/285; 60/274; 60/284; 60/286; 60/289; 123/90.15; 123/90.16; 123/90.18

(58) Field of Classification Search
USPC ........... 60/274–324; 123/90.15–90.18, 179.3, 123/179.4
See application file for complete search history.

(56) References Cited

U.S. PATENT DOCUMENTS

| 6,647,955 | B1 | 11/2003 | Sieber | |
|---|---|---|---|---|
| 8,069,829 | B2* | 12/2011 | Leone | 123/90.17 |
| 8,160,801 | B2* | 4/2012 | Ezaki et al. | 701/103 |
| 8,239,121 | B2* | 8/2012 | Hattori et al. | 701/105 |

(Continued)

FOREIGN PATENT DOCUMENTS

| JP | 11 082076 | 3/1999 |
|---|---|---|
| JP | 2000 154737 | 6/2000 |

(Continued)

OTHER PUBLICATIONS

International Search Report issued Feb. 9, 2010 in PCT/JP10/050510 filed Jan. 18, 2010.

(Continued)

*Primary Examiner* — Thomas E. Denion
*Assistant Examiner* — Jesse Bogue
(74) *Attorney, Agent, or Firm* — Oblon, Spivak, McClelland, Maier & Neustadt, L.L.P.

(57) ABSTRACT

There is provided a control apparatus for an internal combustion engine, which can favorably reduce a load necessary for cranking at the time of the next start, while preventing the fresh air inflow to a catalyst at the time of the stop of the internal combustion engine. A valve stop command is issued to an electrically-driven actuator so that the operational states of intake and exhaust valves becomes a valve closed/stopped state when fuel supply is stopped in response to an establishment of a predetermined stop condition of the internal combustion engine. Then, to return the operational states of the intake and exhaust valves to a valve operating state after the completion of the stopping operation of the internal combustion engine, a valve return command is issued to the actuator, and a crankshaft is rotationally driven by a predetermined angle required to return the operational states of the intake and exhaust valves to the valve operating state.

8 Claims, 11 Drawing Sheets

U.S. PATENT DOCUMENTS

| | | | |
|---|---|---|---|
| 8,285,469 B2 * | 10/2012 | Sano et al. | 701/103 |
| 8,326,519 B2 * | 12/2012 | McDonald et al. | 701/112 |
| 2003/0106515 A1 * | 6/2003 | Kondo | 123/179.4 |
| 2007/0163531 A1 * | 7/2007 | Lewis et al. | 123/179.4 |
| 2009/0050087 A1 * | 2/2009 | Ezaki | 123/90.16 |
| 2011/0106406 A1 * | 5/2011 | Moriya | 701/103 |
| 2011/0271918 A1 * | 11/2011 | Nishikiori et al. | 123/90.1 |
| 2012/0245828 A1 * | 9/2012 | Ezaki | 701/105 |

FOREIGN PATENT DOCUMENTS

| | | |
|---|---|---|
| JP | 2000 170560 | 6/2000 |
| JP | 2001 090564 | 4/2001 |
| JP | 2004 183613 | 7/2004 |
| JP | 2004 225561 | 8/2004 |
| JP | 2005 090463 | 4/2005 |
| JP | 2005 264927 | 9/2005 |
| JP | 2008 267234 | 11/2008 |

OTHER PUBLICATIONS

Extended European Search Report issued Mar. 15, 2013, in European Patent Application No. 10843062.0.

* cited by examiner

Rotational direction of cam

US 8,443,588 B2

CONTROL APPARATUS FOR INTERNAL COMBUSTION ENGINE

TECHNICAL FIELD

The present invention relates to a control apparatus for an internal combustion engine, and more particularly to a control apparatus for an internal combustion engine including a variable valve operating apparatus that can maintain at least one of an intake valve and an exhaust valve in a valve closed/stopped state.

BACKGROUND ART

Conventionally, for example, Patent Document 1 discloses a stop control apparatus for an internal combustion engine mounted in a vehicle that can execute a regenerative power generation by driving a generator using its kinetic energy during deceleration. The conventional control apparatus controls the operation of a valve operating mechanism in such a way that intake valves and exhaust valves are closed during the execution of the regenerative power generation. Moreover, when the internal combustion engine is stopped ceaselessly from a state in which such a regenerative power generation is being executed, the operation of the valve operating mechanism is controlled so that the internal combustion engine stops after a compression pressure of the internal combustion engine is opened by opening the intake valves and the exhaust valves. According to such conventional control, it is possible to prevent push-back action of a piston by the compression pressure in the cylinder from being generated in the process of stopping the internal combustion engine, and thereby to reduce the vibration when stopping the internal combustion engine.

Including the above-mentioned document, the applicant is aware of the following documents as a related art of the present invention.

CITATION LIST

Patent Literature

Patent Document 1: Japanese Laid-open Patent Application Publication No. 2004-183613
Patent Document 2: Japanese Laid-open Patent Application Publication No. 2005-264927
Patent Document 3: Japanese Laid-open Patent Application Publication No. 2001-090564
Patent Document 4: Japanese Laid-open Patent Application Publication No. 2000-170560
Patent Document 5: Japanese Laid-open Patent Application Publication No. 2004-225561
Patent Document 6: Japanese Laid-open Patent Application Publication No. 11-082076
Patent Document 7: Japanese Laid-open Patent Application Publication No. 2000-154737

SUMMARY OF INVENTION

Technical Problem

If the intake valves and the exhaust valves are opened in the process of stopping the internal combustion engine as in the conventional technique described above, fresh air flows into a catalyst disposed in an exhaust passage. As a result of that, if the catalyst is in a high-temperature state, there is a concern that the degradation of the catalyst arise. If, on the other hand, the intake valves and the exhaust valves are maintained in a valve closed/stopped state during the stop of the internal combustion engine, a load necessary for cranking at the time of the next start becomes high and thus there is a concern that it is difficult to secure a favorable startability.

The present invention has been made to solve the problem as described above, and has its object to provide a control apparatus for an internal combustion engine, which can favorably reduce a load necessary for cranking at the time of the next start, while preventing the fresh air inflow to a catalyst at the time of the stop of the internal combustion engine.

Solution to Problem

A first aspect of the present invention is a control apparatus for an internal combustion engine, the apparatus comprising:

a variable valve operating apparatus which is capable of changing an operational state of at least one of an intake valve and an exhaust valve between a valve operating state and a valve closed/stopped state, has an electrically-driven actuator, and is configured so that the operational state of the at least one of the valves becomes the valve closed/stopped state in response to a valve stop command to the actuator and so that the operational state of the at least one of the valves is returned to the valve operating state when a camshaft rotates by a predetermined angle after a valve return command to the actuator is issued;

valve stop command means which issues the valve stop command to the actuator so that the operational state of the at least one of the valves becomes the valve closed/stopped state when fuel supply to the internal combustion engine is stopped in response to an establishment of a predetermined stop condition of the internal combustion engine;

valve return command means which issues the valve return command to the actuator so that the operational state of the at least one of the valves is returned to the valve operating state during a predetermined time period immediately before a completion of a stopping operation of the internal combustion engine or after a completion of the stopping operation; and camshaft drive means which rotationally drives the camshaft by the predetermined angle required to return the operational state of the at least one of the valves to the valve operating state at or after a time point when the valve return command is issued by the valve return command means.

Moreover, a second aspect of the present invention is the control apparatus for an internal combustion engine according to the first aspect of the present invention, wherein the actuator is a valve stop actuator which is used for changing the operational state of the at least one of the valves to the valve closed/stopped state, wherein the variable valve operating apparatus is configured so that the operational state of the at least one of the valves is maintained in the valve closed/stopped state by keeping the valve stop actuator energized and so that the operational state of the at least one of the valves is returned to the valve operating state when the camshaft is rotated by a predetermined angle after the energization of the valve stop actuator is stopped, wherein the valve stop command means issues an energization command to the valve stop actuator as the valve stop command, and wherein the valve return command means issues an energization stop command to the valve stop actuator.

Moreover, a third aspect of the present invention is the control apparatus for an internal combustion engine according to the first or second aspect of the present invention, wherein the apparatus further comprises catalyst temperature acquisition means which acquires a temperature of a catalyst disposed in an exhaust passage of the internal combustion engine, and wherein the valve return command means issues the valve return command when the temperature of the catalyst becomes equal to or lower than a predetermined temperature during a stop of the internal combustion engine.

Moreover, a fourth aspect of the present invention is the control apparatus for an internal combustion engine according to any one of the first to third aspects of the present invention, wherein the camshaft drive means is crankshaft drive means which rotationally drives a crankshaft of the internal combustion engine to rotationally drive the camshaft, and wherein when the internal combustion engine is stopped in response to the establishment of the stop condition, the crankshaft drive means rotationally drives the crankshaft so that the crankshaft is stopped at a timing at which a piston of each cylinder is in a substantially middle position between a top dead center and a bottom dead center.

Advantageous Effects of Invention

According to the configuration of the variable valve operating apparatus in the first or second aspect of the present invention, in order to return the operational state of a valve to the valve operating state, it is not enough to issue the valve return command to the electrically-driven actuator and it is also necessary to rotationally drive the camshaft by the predetermined angle after the valve stop command. According to the present invention, the camshaft is rotationally driven by the predetermined angle required to return the operational state of the valve to the valve operating state at or after the time point when the valve return command is issued during the predetermined time period immediately before the completion of the stopping operation of the internal combustion engine or after the completion of the stopping operation. Therefore, the present invention makes it possible to prevent fresh air from flowing into the catalyst disposed in the exhaust passage in the process of stopping the internal combustion engine. Further, according to the present invention, by returning the valve to the valve operating state at the timing of the completion of the stop of the internal combustion engine or during the stop, the load required for cranking upon the next start can be reduced.

According to the third aspect of the present invention, the valve return command is issued when the temperature of the catalyst becomes equal to or less than the predetermined temperature during the stop of the internal combustion engine, and, in accordance with this, the camshaft is rotationally driven by the predetermined angle required to return the operational state of the valve to the valve operating state. Therefore, the present invention makes it possible to additionally attempt to suppress the degradation of the catalyst at the time of the start, while achieving the suppression of degradation of the catalyst by preventing the fresh air from flowing into the catalyst in the process of stopping the internal combustion engine, and the reduction of the load required for cranking at the time of the next start.

According to the fourth aspect of the present invention, it is possible that the piston of a certain cylinder is not stopped near the bottom dead center, and thus the load required for cranking at the time of the next start can be reduced more successfully.

Figure 1:
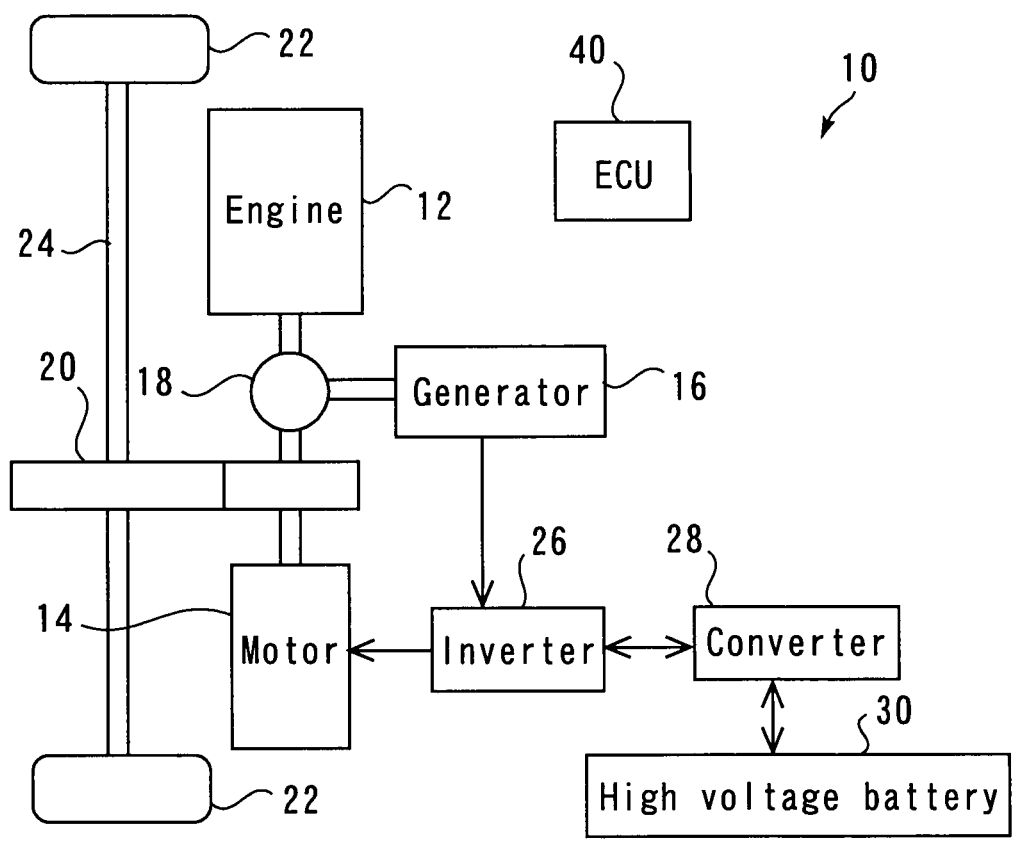
FIG. 1 is a diagram for showing a schematic configuration of a drive system for a hybrid vehicle to which the present invention is applied.

DESCRIPTION OF SYMBOLS 10 drive system
12 internal combustion engine
14 vehicle driving motor
16 generator
18 power dividing mechanism
30 high voltage battery
40 ECU (Electronic Control Unit)
42 piston
44 combustion chamber
46 intake passage
48 exhaust passage
54 fuel injection valve
56 ignition plug
58 intake valve
60 exhaust valve
62 intake variable valve operating apparatus
64 exhaust variable valve operating apparatus
66 catalyst
68 catalyst temperature sensor
70 crankshaft
72 crank angle sensor
80 camshaft
82 main cam 84 auxiliary cam
86 variable mechanism
90 changeover mechanism
96 first rocker arm
98L, 98R second rocker arm
112, 118L, 118R changeover pin
120 return spring
122 slide pin
128 guide rail
130 electrically-driven actuator
132 solenoid
134 lock pin
Pmax1 displacement end
Pmax2 displacement end

DESCRIPTION OF EMBODIMENTS

First Embodiment

[Configuration of HV System]

FIG. 1 is a diagram for showing a schematic configuration of a drive system 10 for a hybrid vehicle to which the present invention is applied. The drive system 10 includes an internal combustion engine 12 and a vehicle driving motor (hereinafter simply referred to as a "motor") 14 as power sources of the vehicle. The drive system 10 also includes a generator 16 that receives a supply of a drive force and generates electric power.

The internal combustion engine 12, the motor 14, and the generator 16 are mutually connected via a planetary gear type power dividing mechanism 18. More specifically, the rotating shaft of a planetary carrier (not shown) of the power dividing mechanism 18 is linked to a crankshaft 70 described later of the internal combustion engine 12. In addition, the rotating shaft of a ring gear (not shown) of the power dividing mechanism 18 is directly connected to the rotating shaft of the motor 14. Furthermore, a reducer 20 is connected to a rotating shaft of the motor 14 connected to the power dividing mechanism 18. The reducer 20 connects the rotating shaft of the motor 14 with a drive shaft 24 connected to drive wheels 22. The power dividing mechanism 18 divides a drive force of the internal combustion engine 12 into the generator 16 and the reducer 20. The distribution rate of the drive force by the power dividing mechanism 18 can be freely changed.

The drive system 10 further includes an inverter 26, a converter 28, and a high voltage battery 30. The inverter 26 is connected to the generator 16 and the motor 14, and also connected to the high voltage battery 30 via the converter 28. The electric power generated by the generator 16 may be supplied to the motor 14 via the inverter 26, or charged into the high voltage battery 30 via the inverter 26 and the converter 28. The electric power charged into the high voltage battery 30 can be supplied to the motor 14 via the converter 28 and the inverter 26.

The drive system 10 described above can rotate the drive wheels 22 only by the drive force of the internal combustion engine 12 in a state in which the motor 14 is being stopped, and, conversely, can rotate the drive wheels 22 only by the drive force of the motor 14 in a state in which the internal combustion engine 12 is being stopped, according to predetermined conditions. In addition, the system can also rotate the drive wheels 22 by the drive forces of both the motor 14 and the internal combustion engine 12 while operating both of them. Furthermore, by the generator 16 functioning as a starter to drive (crank) the internal combustion engine 12, it is also possible to control the start-up of the internal combustion engine 12.

The drive system 10 of the present embodiment is controlled by an electronic control unit (ECU) 40. The ECU 40 comprehensively controls the drive system 10 including the internal combustion engine 12, the motor 14, the generator 16, the power dividing mechanism 18, the inverter 26, the converter 28, and the like.

[System Configuration of Internal Combustion Engine]

Figure 2:
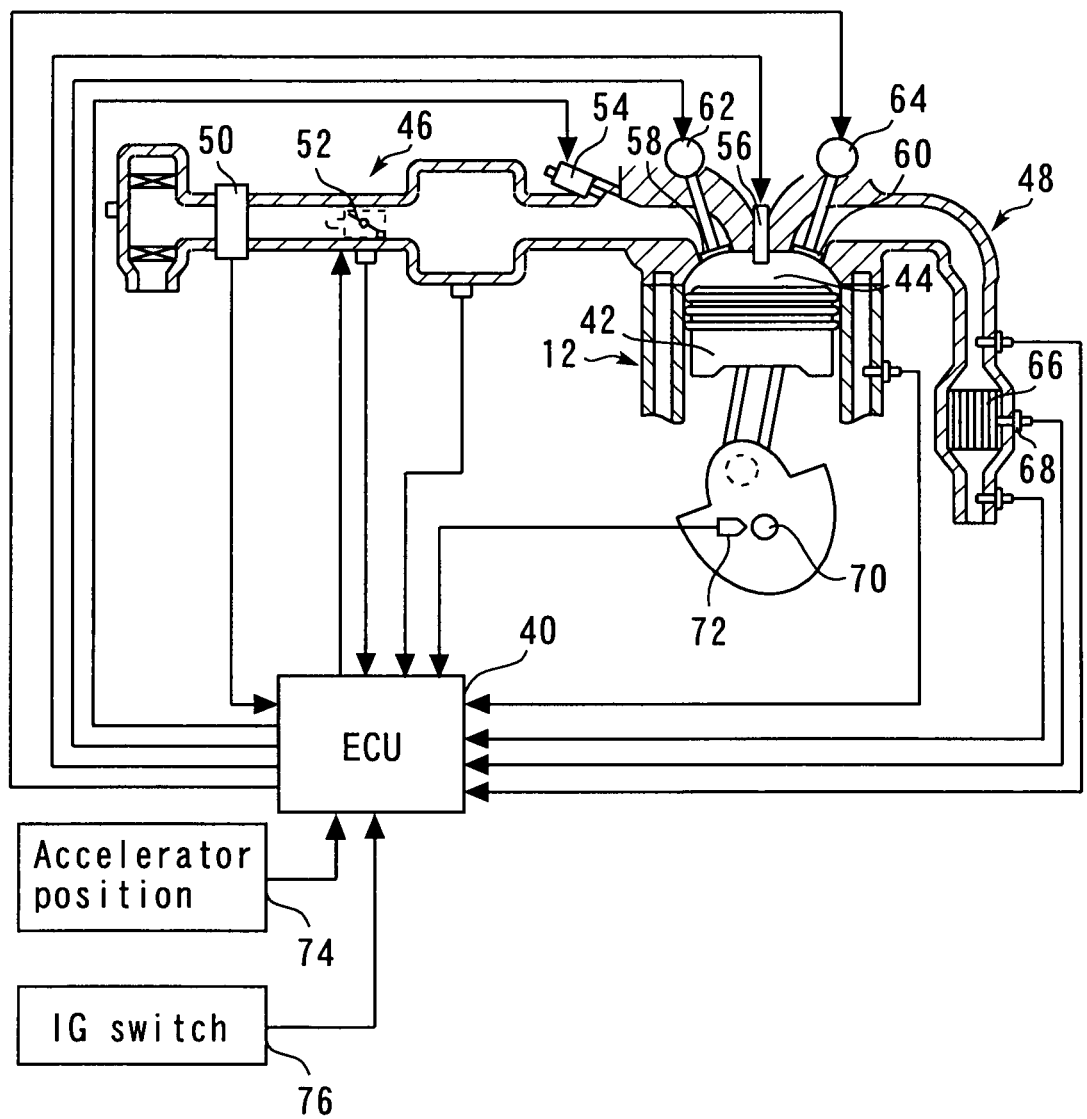
FIG. 2 is a diagram for explaining the system configuration of the internal combustion engine shown in FIG. 1.

FIG. 2 is a diagram for explaining the system configuration of the internal combustion engine 12 shown in FIG. 1. The system shown in FIG. 2 includes the internal combustion engine 12. Although the number of cylinders and the cylinder arrangement of the internal combustion engine 12 in the present invention are not limited especially, the internal combustion engine 12 in the present embodiment is supposed to be a straight 4-cylinder engine which includes four cylinders from No. 1 to No. 4 cylinders. Each of cylinders of the internal combustion engine 12 contains a piston 42. Each of the cylinders of the internal combustion engine 12 has a combustion chamber 44 formed atop the piston 42. An intake passage 46 and an exhaust passage 48 are communicated with the combustion chamber 44.

An air flow meter 50 is installed near the inlet of the intake passage 46 to output a signal representing the flow rate of the air taken into the intake passage 46. A throttle valve 52 is installed downstream of the air flow meter 50. The throttle valve 52 is an electronically controlled throttle valve that can control an open position of the throttle valve independently of an open position of an accelerator.

A fuel injection valve 54 for injecting a fuel into an intake port of the internal combustion engine 12 is disposed downstream with respect to the throttle valve 52. At a cylinder head of the internal combustion engine 12, an ignition plug 56 is mounted for igniting air-fuel mixture in the combustion chamber 44. Intake valves 58 and exhaust valves 60 are provided at the intake port and an exhaust port, respectively. The intake valves 58 establish continuity or discontinuity between the combustion chamber 44 and the intake passage 46, and the exhaust valves 60 establish continuity or discontinuity between the combustion chamber 44 and the exhaust passage 48.

The intake valves 58 and the exhaust valves 60 are driven by an intake variable valve operating apparatus 62 and an exhaust variable valve operating apparatus 64, respectively. These variable valve operating apparatuses 62 and 64 will be described later with reference to FIGS. 3 to 12. In addition, in the exhaust passage 48, a catalyst 66 for purifying exhaust gas is disposed. A catalyst temperature sensor 68 is attached to the catalyst 66 to detect the temperature thereof.

Furthermore, there are electrically connected to the input of the ECU 40 described above, various types of sensors to control the internal combustion engine 12, such as a crank angle sensor 72 for detecting a rotational angle of a crankshaft 70 (crank angle) and an engine rotational speed, and an accelerator position sensor 74 for detecting a position of an accelerator pedal of the hybrid vehicle in which the internal combustion engine 12 is mounted, and an ignition switch (IG switch) 76 of the vehicle, as well as the various types of sensors described above. In addition, there are electrically connected to the output of the ECU 40, various types of actuators such as the fuel injection valve 54. The ECU 40 can control the operating state of the internal combustion engine 12 based on those sensor outputs.

Next, the configuration of the variable valve operating apparatuses 62 and 64 and the operation thereof will be described with reference to FIGS. 3 to 12.

[Configuration of Variable Valve Operating Apparatus]

Figure 3:
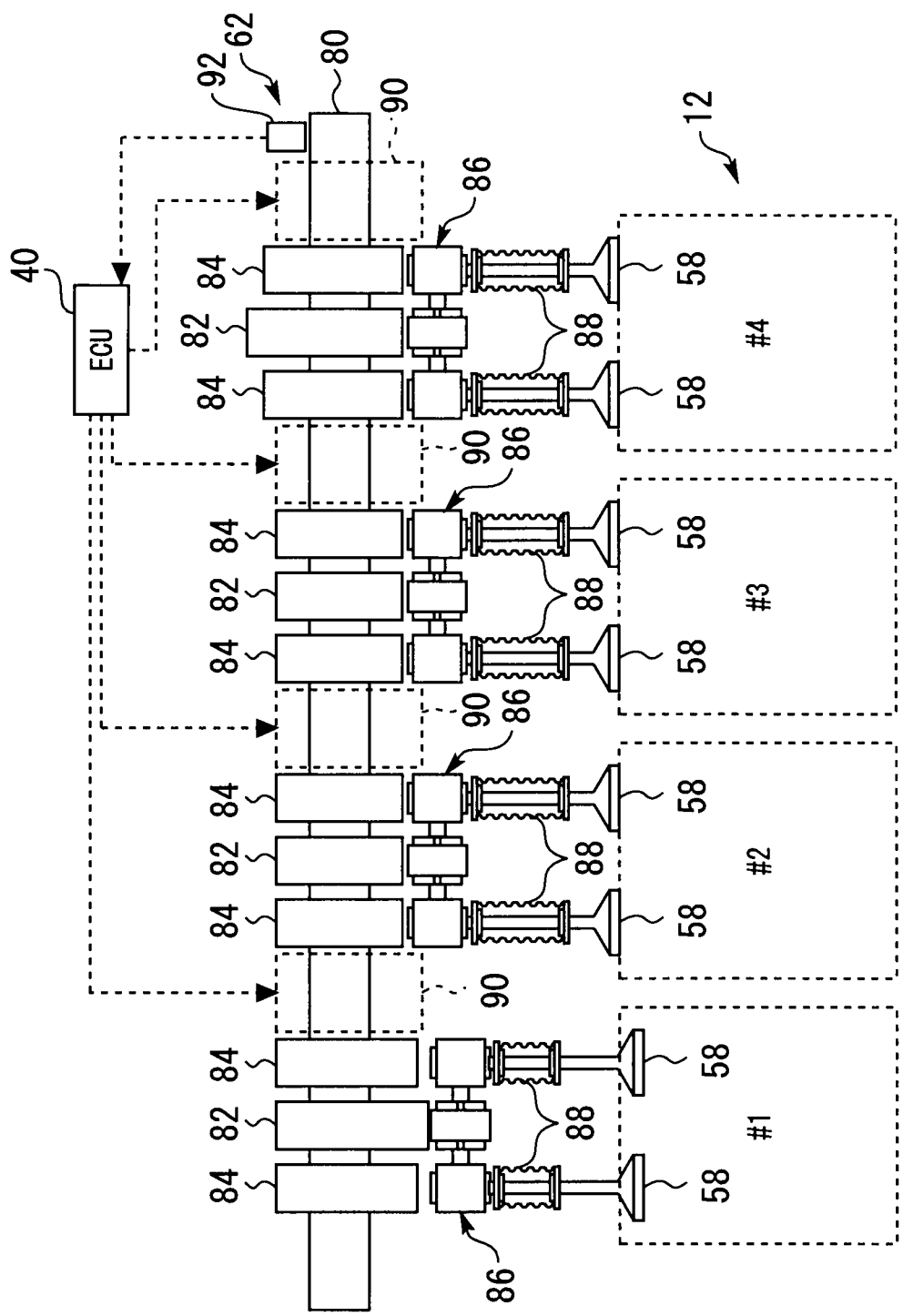
FIG. 3 is a schematic diagram showing the overall configuration of the intake variable valve operating apparatus shown in FIG. 2.

FIG. 3 is a schematic diagram showing the overall configuration of the intake variable valve operating apparatus 62 shown in FIG. 2. It is noted that description will herein be made on an example of the intake variable valve operating apparatus 62, while it is assumed that the exhaust variable valve operating apparatus 64 is basically configured in the same manner as the intake variable valve operating apparatus 62.

The variable valve operating apparatus 62 of the present embodiment includes a camshaft 80. The camshaft 80 is connected to the crankshaft 70 (See FIG. 2) by means of a timing chain or a timing belt and is configured to rotate at a half speed of that of the crankshaft 70. The camshaft 80 is formed with a main cam 82 and two auxiliary cams 84 for one cylinder.

The main cam 82 includes an arc-shaped base circle part 82a (see FIG. 5) concentric with the camshaft 80, and a nose part 82b (see FIG. 5) which is formed such that a part of the base circle expands outwardly in the radial direction. Moreover, in the present embodiment, the auxiliary cam 84 is configured to be a cam which includes only a base circle part (a zero lift cam) (see FIG. 6).

A variable mechanism 86 is interposed between the cams 82 and 84, and the intake valves 58 (hereafter, simply abbreviated as the "valves 58") of each cylinder. That is, the acting force of the cam 82 or 84 is arranged to be transferred to the two valves 58 via the variable mechanism 86. The valves 58 are adapted to be opened and closed by use of the acting force of the cam 82 or 84, and the biasing force of valve spring 88.

Moreover, the variable valve operating apparatus 62 of the present embodiment includes, for each cylinder, a changeover mechanism 90 for driving each variable mechanism 86 to switch operational states of the valves 58 between a valve operating state and a valve closed/stopped state. In addition, there is connected to the ECU 40, a cam angle sensor 92 for detecting a rotational angle of the camshaft 80. The changeover mechanism 90 is adapted to be driven according to a driving signal from the ECU 40 described above.

(Configuration of Variable Mechanism)

Next, a detailed configuration of the variable mechanism 86 will be described with reference to FIGS. 4 to 6.

Figure 4:
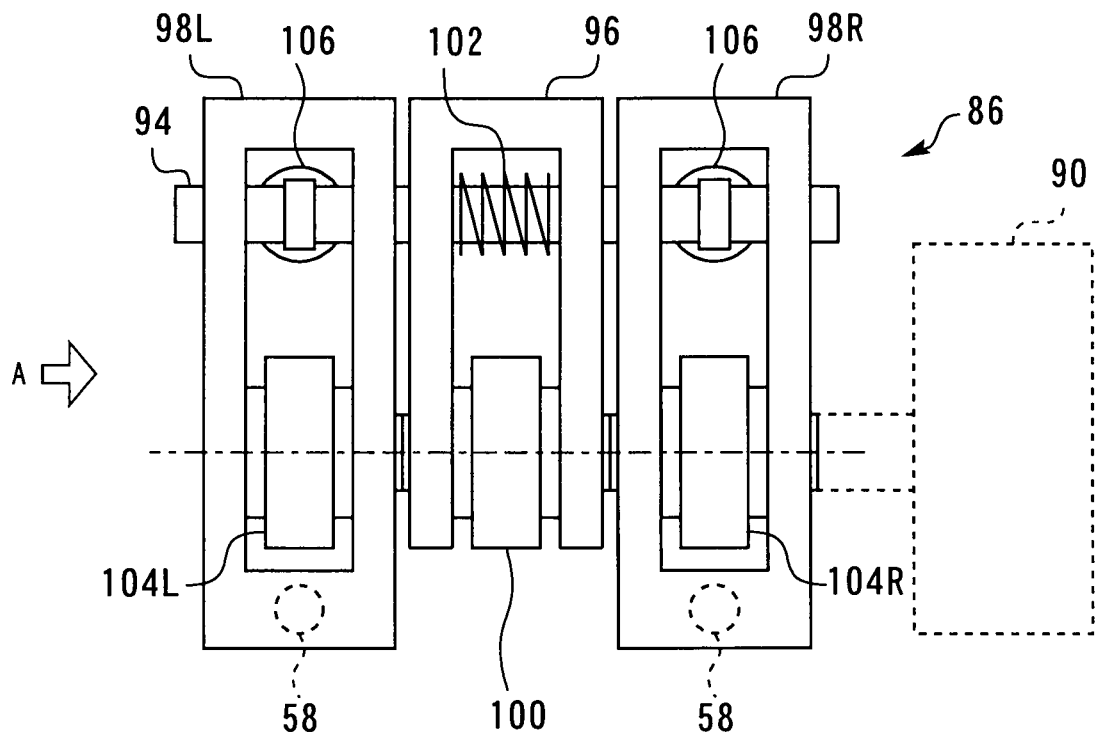
FIG. 4 is a look-down view of the variable mechanism shown in FIG. 3 seen from the proximal end part side of a valve.

FIG. 4 is a look-down view of the variable mechanism 86 shown in FIG. 3 seen from the proximal end part side of the valve 58.

The variable mechanism 86 includes a rocker shaft 94 which is disposed in parallel with the camshaft 80. As shown in FIG. 4, a first rocker arm 96 and a pair of second rocker arms 98R and 98L are rotatably attached to the rocker shaft 94.

Figure 5:
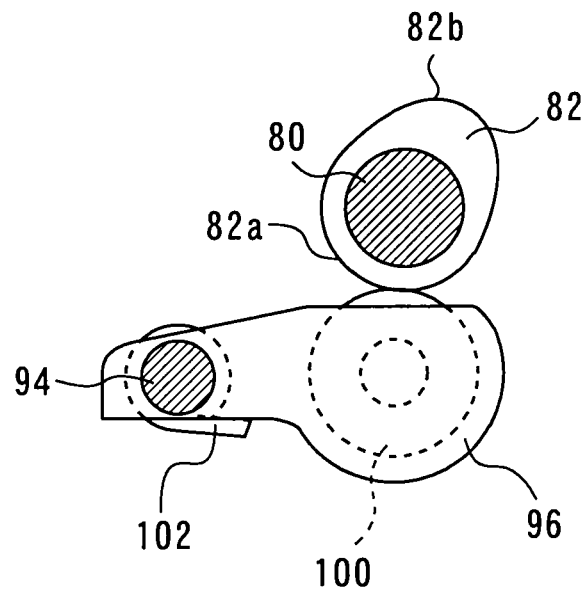
FIG. 5 is a view of a first rocker arm seen from the axial direction (the direction shown by an arrow A in FIG. 4) of a rocker shaft.
Figure 6:
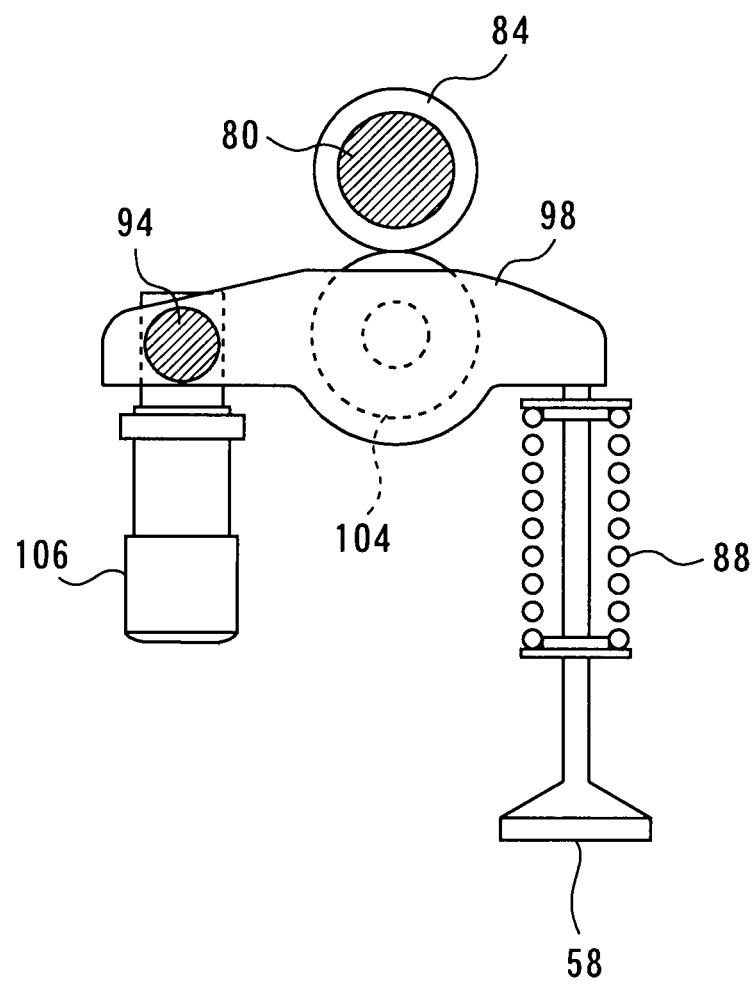
FIG. 6 is a view of a second rocker arm seen from the axial direction (the direction shown by the arrow A) of the rocker shaft in the same manner as in FIG. 5.

FIG. 5 is a view of the first rocker arm 96 seen from the axial direction (the direction shown by an arrow A in FIG. 4) of the rocker shaft 94, and FIG. 6 is a view of the second rocker arm 98 seen from the axial direction (the direction shown by the arrow A) of the rocker shaft 94 in the same manner as in FIG. 5.

As shown in FIG. 5, a first roller 100 is rotatably attached to the end part opposite to the rocker shaft 94 in the first rocker arm 96 at a position which allows a contact with the main cam 82. The first rocker arm 96 is biased by a coil spring 102 attached to the rocker shaft 94 such that the first roller 100 is constantly in abutment with the main cam 82.

On the other hand, as shown in FIG. 6, a second roller 104 is rotatably attached to a central portion of the second rocker arm 98. Moreover, it is supposed that the rocker shaft 94 is supported by a stationary member (for example, the cylinder head) of the internal combustion engine 12 via a rush adjuster 106 at the other end of the second rocker arm 98. The second rocker arm 98 is biased toward the auxiliary cam 84 by being subjected to an upward force from the rush adjuster 106.

(Configuration of Changeover Mechanism)

Next, a detailed configuration of the changeover mechanism 90 will be described with reference to FIGS. 7 and 8.

The changeover mechanism 90, which is a mechanism for switching the connection/disconnection concerning the first rocker arm 96 and the second rocker arms 98, makes it possible to switch the operational states of the valves 58 between the valve operating state and the valve closed/stopped state by switching the state in which the acting force of the main cam 82 is transferred to the second rocker arms 98 and the state in which the forgoing acting force is not transferred to the second rocker arms 98.

Figure 7:
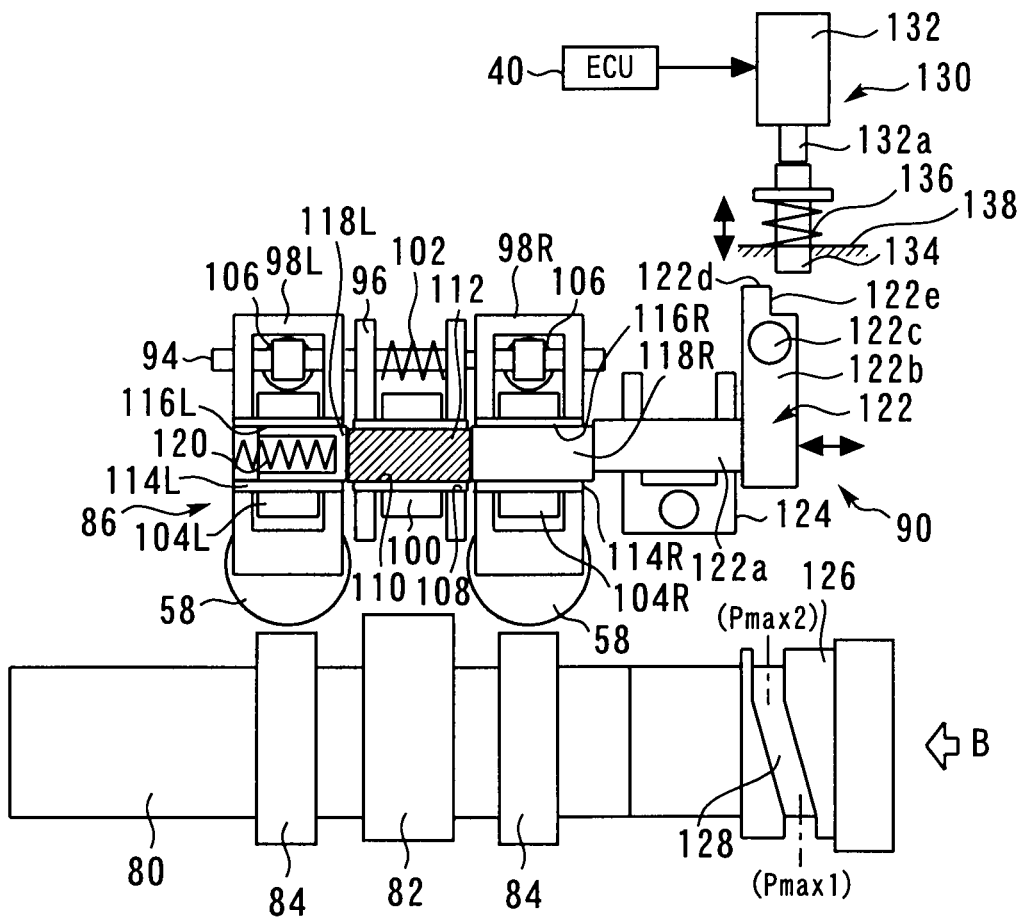
FIG. 7 is a diagram illustrating a detailed configuration of a changeover mechanism shown in FIG. 3.

FIG. 7 is a diagram illustrating a detailed configuration of the changeover mechanism 90 shown in FIG. 3. In is noted that in FIG. 7, the variable mechanism 86 is represented by using a section taken at the axial centers of the rollers 100 and 104. Moreover, for the sake of simplicity of description, the mounting position of the camshaft 80 with respect to the mounting position of the variable mechanism 86 is represented in a state different from the actual mounting position excepting the axial position of the camshaft 80.

As shown in FIG. 7, a first pin hole 110 is formed within a first spindle 108 of the first roller 100. A first changeover pin 112 having a circular column shape is slidably inserted into the first pin hole 110.

On the other hand, there is formed inside a second spindle 114L of the second roller 104 of the second rocker arm 98L side, a second pin hole 116L of which end part opposite to the first rocker arm 96 is closed and of which end part of the first rocker arm 96 side is opened. Moreover, inside a second spindle 114R of the second roller 104 of the second rocker arm 98R side, a second pin hole 116R is formed. A second changeover pin 118L of a circular column shape is slidably inserted into the second pin hole 116L. Moreover, inside the second pin hole 116L, there is disposed a return spring 120 which biases the second changeover pin 118L toward the first rocker arm 96 direction (hereafter, referred to as the "advancing direction of changeover pin"). In addition, a second changeover pin 118R of a circular column shape is slidably inserted into the second pin hole 116R.

Figure 8:
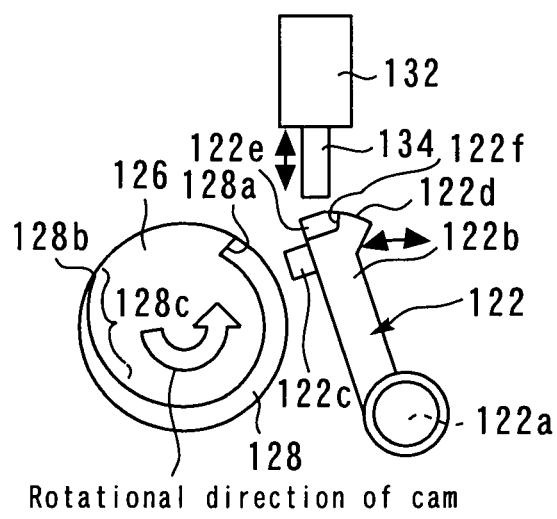
FIG. 8 is a view of the changeover mechanism seen from the axial direction of a camshaft (the direction of an arrow B in FIG. 7)

Here, newly referring to FIG. 8 as well as above described FIG. 7, description on the changeover mechanism 90 will be continued.

FIG. 8 is a view of the changeover mechanism 90 seen from the axial direction of the camshaft 80 (the direction of an arrow B in FIG. 7).

The changeover mechanism 90 includes a slide pin 122 for forcing the changeover pins 112, 118L, and 118R to be displaced toward the second rocker arm 98L side (in the retreating direction of the changeover pin) with the aid of the rotational force of the camshaft 80. The slide pin 122 includes, as shown in FIG. 7, a circular column part 122a having a end face which is in abutment with the end face of the second changeover pin 118R. The circular column part 122a is supported by a support member 124 fixed to the cam carrier so as to be advanceable/retreatable in the axial direction and rotatable in the circumferential direction.

Moreover, a bar-like arm part 122b is provided so as to protrude outwardly in the radial direction of the circular column part 122a at the end part opposite to the second changeover pin 118R in the circular column part 122a. That is, the arm part 122b is configured to be rotatable around the axial center of the circular column part 122a. The distal end part of the arm part 122b is configured, as shown in FIG. 8, to extend up to a position opposed to the peripheral surface of the camshaft 80. Moreover, a projection part 122c is provided at the distal end part of the arm part 122b so as to protrude toward the peripheral surface of the camshaft 80.

There is formed in the outer peripheral surface opposed to the projection part 122c in the camshaft 80, a large-diameter part 126 having a larger diameter than that of the camshaft 80. There is formed in the peripheral surface of the large-diameter part 126, a helical guide rail 128 extending in the circumferential direction.

Moreover, the changeover mechanism 90 includes an actuator 130 for inserting the projection part 122c into the guide rail 128. To be more specific, the actuator 130 includes a solenoid 132 which is duty controlled based on the command from the ECU 40 and a lock pin 134 which is in abutment with the drive axis 132a of the solenoid 132. The lock pin 134 is formed into a cylindrical shape.

One end of the spring 136, which exerts a biasing force against the thrust of the solenoid 132, is fixedly engaged to the lock pin 134 and the other end of the spring 136 is fixedly engaged to a support member 138 fixed to the cam carrier which is a stationary member. According to such configuration, when the solenoid 132 is driven based on the command from the ECU 40, the lock pin 134 can be advanced as a result of the thrust of the solenoid 132 overpowering the biasing force of the spring 136 and, on the other hand, when the driving of the solenoid 132 is stopped, the lock pin 134 and the driving shaft 132a can be quickly retreated to a predetermined position by the biasing force of the spring 136. Moreover, the lock pin 134 is restricted from moving in its radial direction by the support member 138.

Moreover, it is supposed that the solenoid 132 is fixed to a stationary member such as a cam carrier, at a position where the lock pin 134 can press the pressing surface (the surface opposite to the surface where the projection part 122c is provided) 122d of the distal end part of the arm part 122b of the slide pin 122 against the guide rail 128.

The helical direction in the guide rail 128 of the camshaft 80 is arranged such that when the camshaft 80 is rotated in a predetermined rotational direction shown in FIG. 8 with the projection part 122c being inserted thereinto, the slide pin 122 causes the changeover pins 112, 118L, and 118R to be displaced in the direction approaching the rocker arms 96 and 98 while pushing aside them in the retreating direction against the biasing force of the return spring 120.

Here, the position of the slide pin 122, in a state where the second changeover pin 118L is inserted into both the second pin hole 116L and the first pin hole 110 and where the first changeover pin 112 is inserted into both the first pin hole 110 and the second pin hole 116R by the biasing force of the return spring 120, is referred to as a "displacement end Pmax1". When the slide pin 122 is positioned at this displacement end Pmax1, the first rocker arm 96 and the second rocker arms 98R and 98L all become connected with each other. Moreover, the position of the slide pin 122 in a state where as a result of the changeover pin 112 and the like being subjected to a force from the slide pin 122, the second changeover pin 118L, the first changeover pin 112, and the second changeover pin 118R are respectively inserted only into the second pin hole 116L, the first pin hole 110, and the second pin hole 116R, is referred to as a "displacement end Pmax 2". That is, when the slide pin 122 is positioned at this displacement end Pmax2, the first rocker arm 96, and the second rocker arms 98R and 98L are all disconnected from each other.

In the present embodiment, the position of the proximal end 128a of the guide rail 128 in the axial direction of the camshaft 80 is arranged so as to coincide with the position of the projection part 122c when the slide pin 122 is positioned at the above described displacement end Pmax1. Further, the position of the terminal end 128b of the guide rail 128 in the axial direction of the camshaft 80 is arranged so as to coincide with the position of the projection part 122c when the slide pin 122 is positioned at the above described displacement end Pmax2. That is, in the present embodiment, the configuration is made such that the slide pin 122 is displacable between the displacement end Pmax1 and the displacement end Pmax2 within the range in which the projection part 122c is guided by the guide rail 128.

Further, as shown in FIG. 8, the guide rail 128 of the present embodiment is provided with a shallow bottom part 128c, in which the depth of the guide rail 128 gradually decreases as the camshaft 80 rotates, as a predetermined section of the terminal end 128b side after the slide pin 122 reaches the displacement end Pmax2.

Moreover, the arm part 122b in the present embodiment is provided with a notch part 122e which is formed into a concave shape by notching a part of a pressing surface 122d. The pressing surface 122d is provided so as to be kept in abutment with the lock pin 134 while the slide pin 122 is displaced from the displacement end Pmax1 to the displacement end Pmax2. Further, the notch part 122e is provided in a portion where it can be engaged with the lock pin 134 when the projection part 122c is taken out on the surface of the large-diameter part 126 by the action of the above described shallow bottom part 128c, in a state where the slide pin 122 is positioned at the above described displacement end Pmax2.

Moreover, the notch part 122e is formed so as to be engaged with the lock pin 134 in a mode in which the rotation of the arm part 122b in the direction in which the projection part 122c is inserted into the guide rail 128 can be restricted, and the movement of the slide pin 122 in the advancing direction of the changeover pin can be restricted. To be more specific, there is provided in the notch part 122e, a guide surface 122f which guides the slide pin 122 so as to move away from the large-diameter part 126 as the lock pin 134 moves into the notch part 122e.

[Operation of Variable Valve Operating Apparatus]

Next, the operation of the intake variable valve operating apparatus 62 will be described with reference to FIGS. 9 to 12.

(During Valve Operating State)

Figure 9:
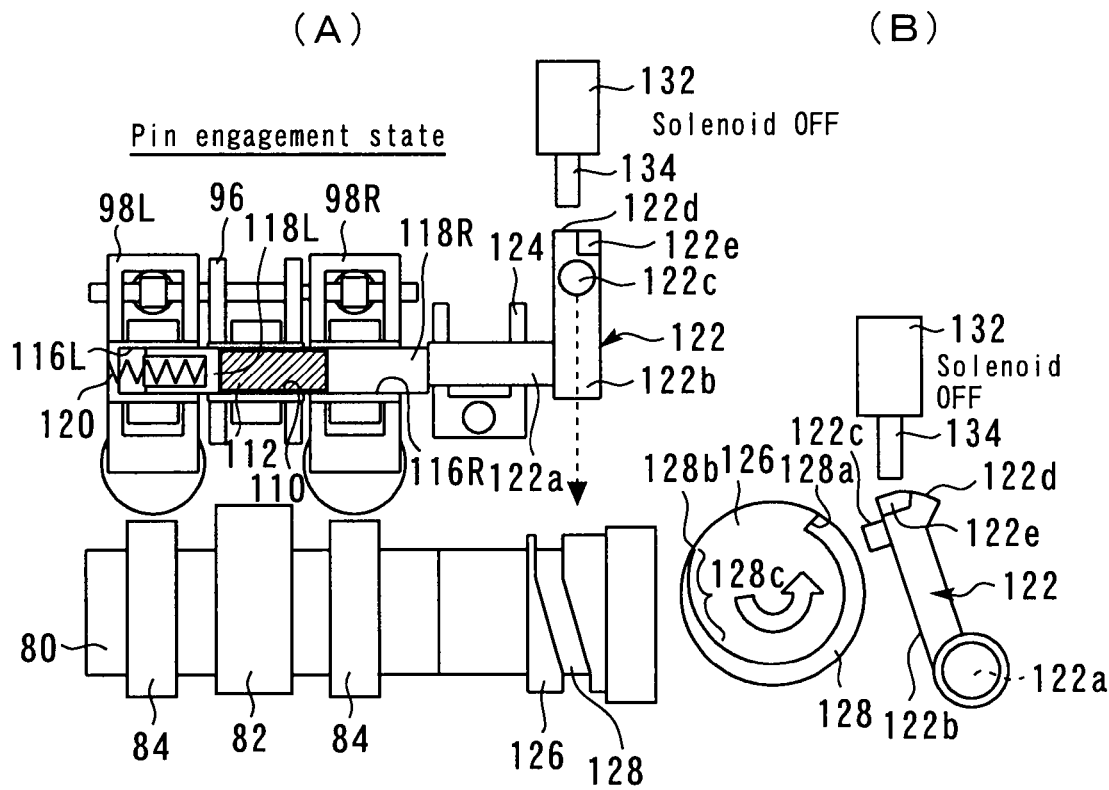
FIG. 9 is a diagram showing a control state during a valve operating state (normal lift operation)

FIG. 9 is a diagram showing a control state during a valve operating state (normal lift operation).

In this case, as shown in FIG. 9(B), the driving of the solenoid 132 is turned off, and thus the slide pin 122 is positioned at the displacement end Pmax1 in a state of being separated from the camshaft 80 and subjected to the biasing force of the return spring 120. In this state, as shown in FIG. 9(A), the first rocker arm 96 and the two second rocker arms 98 are connected via the changeover pins 112 and 118L. As a result of that, the acting force of the main cam 82 is transferred from the first rocker arm 96 to both the valves 58 via the left and right second rocker arms 98R and 98L. Thus, the normal lift operation of the valve 58 is performed according to the profile of the main cam 82.

(At the Start of Valve Stop Operation (the Start of Slide Operation))

Figure 10:
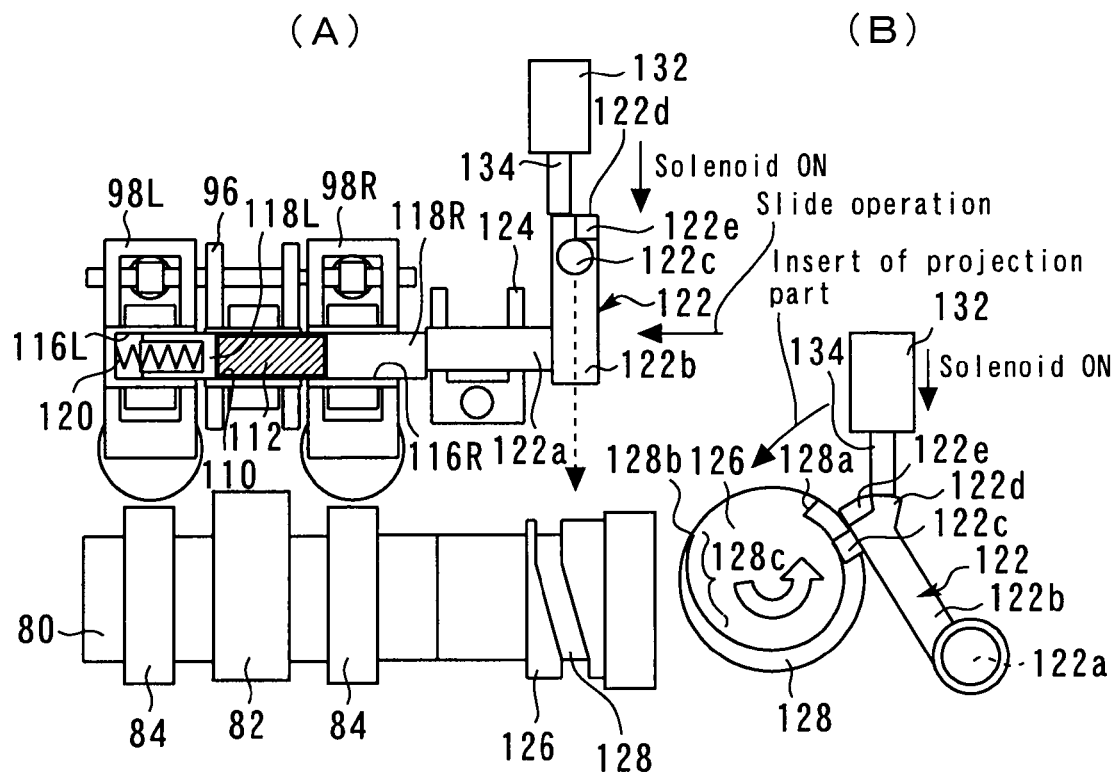
FIG. 10 is a diagram showing a control state at the start of a valve stop operation.

FIG. 10 is a diagram showing a control state at the start of a valve stop operation.

The valve stop operation is performed when, for example, an execution request of a predetermined valve stop operation such as a fuel cut request of the internal combustion engine 12 is detected by the ECU 40. Since such valve stop operation is an operation to displace the changeover pins 112, 118L, and 118R in their retreating direction by means of the slide pin 122 with the aid of the rotational force of the camshaft 80, such operation needs to be performed while the axial centers of these changeover pins 112, 118L, and 118R are positioned on the same straight line, that is, while the first rocker arm 96 is not oscillating.

In the present embodiment, the guide rail 128 is arranged such that the section within which the slide pin 122 performs a slide operation in the retreating direction of changeover pins corresponds to the base circle section of the main cam 82. As a result of this, when the ECU 40 detects an execution request for a predetermined valve stop operation, with the solenoid 132 being driven in the order starting from a cylinder at which the base circle section first arrives, as shown in FIG. 10(B), the projection part 122c is inserted into the guide rail 128, thereby successively starting the valve stop operation of each cylinder. More specifically, as the projection part 122c which has been inserted into the guide rail 128 being guided by the guide rail 128, a slide operation of the slide pin 122 is started toward the displacement end Pmax2 side, as shown in FIG. 10(A), with the aid of the rotational force of the camshaft 80.

(At the Completion of Slide Operation)

Figure 11:
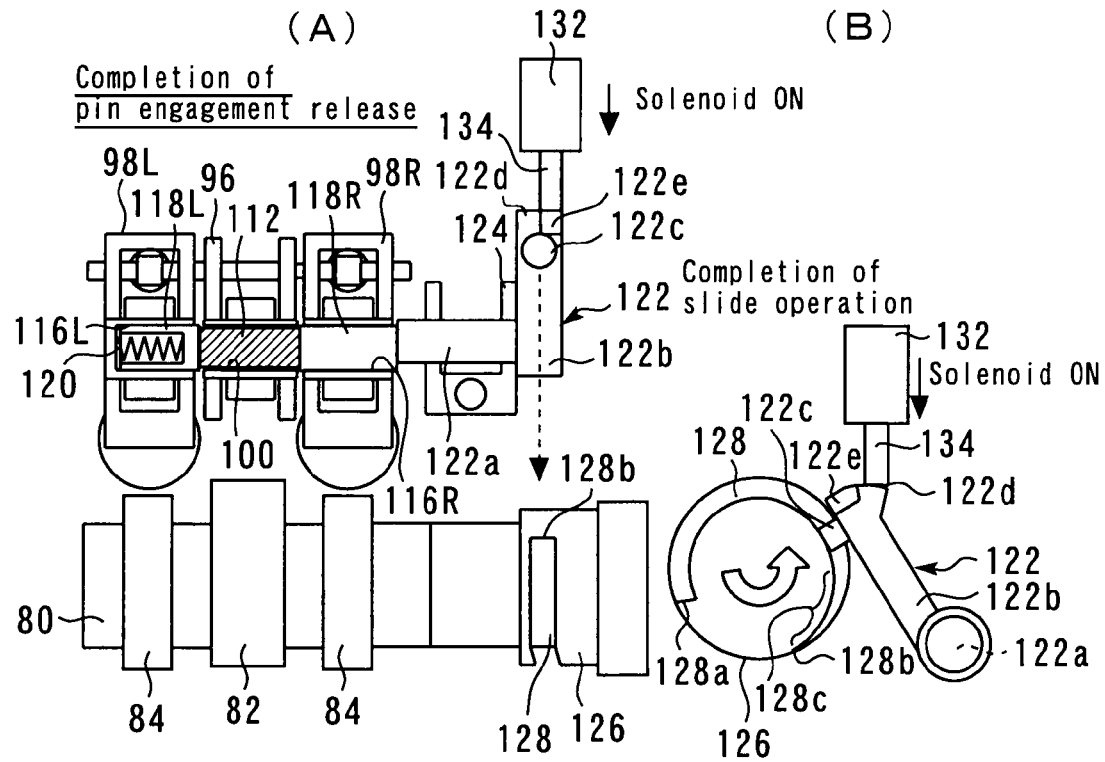
FIG. 11 is a diagram showing a control state at the completion of the slide operation.

FIG. 11 is a diagram showing a control state at the completion of the slide operation.

During the execution of the slide operation, the slide pin 122 moves toward the displacement end Pmax2, in a state in which the biasing force of the return spring 120 is received by the projection part 122c being in abutment with the side surface of the guide rail 128. FIG. 11(A) shows a timing at which the slide pin 122 has reached the displacement end Pmax2 and the slide operation at the time of a valve stop request is completed, that is, a timing at which the connection between the first rocker arm 96 and the second rocker arms 98R and 98L is released as a result of the first changeover pin 112 and the second changeover pin 118L becoming accommodated into the first pin hole 110 and the second pin hole 116L, respectively. Moreover, at this timing, as shown in FIG. 11(B), the position of the projection part 122c within the guide rail 128 has not yet reached the shallow bottom part 128c.

When the slide operation is completed as shown above, and the first rocker arm 96 and the second rocker arms 98R and 98L become a disconnection state, the first rocker arm 96, which is biased by the coil spring 102 toward the main cam 82 as the main cam 82 rotates, comes to oscillate by itself. As a result of this, the acting force of the main cam 82 is not transferred to the two second rocker arms 98. Further, since the auxiliary cam 84, against which the second rocker arms 98 abuts, are zero lift cams, the force for driving the valves 58 is no more provided to the second rocker arms 98, to which the acting force of the main cam 82 has come not to be transferred. As a result of that, since, regardless of the rotation of the main cam 82, the second rocker arms 98 come into a stationary state, the lift operation of the valves 58 become stopped.

(At the Time of Holding Operation of Displacement Member)

Figure 12:
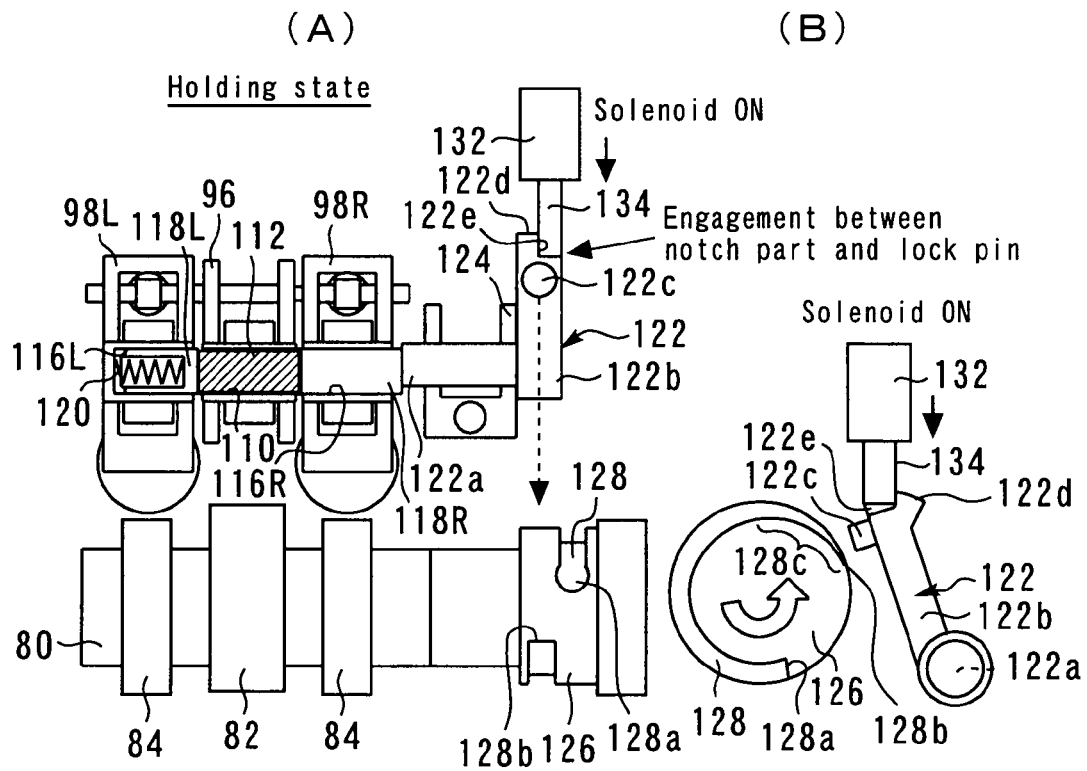
FIG. 12 is a diagram showing a control state at the time of a holding operation to hold a slide pin with a lock pin.

FIG. 12 is a diagram showing a control state at the time of a holding operation to hold the slide pin 122 with the lock pin 134.

When the camshaft 80 further rotates after the slide operation shown in above described FIG. 11 is completed, the projection part 122c comes close to the shallow bottom part 128c in which the depth of the groove gradually decreases. As a result of that, the action of the shallow bottom part 128c causes the slide pin 122 to rotate in the direction separated from the camshaft 80. Then, as the depth of the groove decrease due to the shallow bottom part 128c, the lock pin 134 is displaced a little in its retreating direction. Thereafter, when the slide pin 122 further rotates until the lock pin 134 which is constantly driven by the solenoid 132, coincides with the notch part 122e, the portion of the slide pin 122 side, which is to be abutment with the lock pin 134, is switched from the pressing surface 122d to the notch part 122e.

As a result of that, the lock pin 134 comes to be engaged with the notch part 122e. As a result of this, as shown in FIG. 12(B), the slide pin 122 comes to be held with the projection part 122c being separated from the camshaft 80, and with the biasing force of the return spring 120 being received by the lock pin 134. For this reason, in this holding operation, as shown in FIG. 12(A), the state in which the first rocker arm 96 and the second rocker arms 98 are disconnected, that is, the valve closed/stopped state is maintained.

(At the Time of Valve Return Operation)

A valve return operation for returning the operation from the valve closed/stopped state to the valve operating state in which the normal lift operation is performed is executed, for example, when an execution request of a predetermined valve return operation such as a request for returning from a fuel cut is detected by the ECU 40. Such valve return operation is started by the ECU 40 turning off the energization of the solenoid 132 at a predetermined timing (a timing that is earlier than the start timing of the base circle section in which the changeover pin 112 and the like are movable, by a predetermined time period needed for the operation of the solenoid 132), in a control state shown in FIG. 12. When the energization of the solenoid 132 is turned off, the engagement between the notch part 122e of the slide pin 122 and the lock pin 134 is released. As a result of that, the force to hold the first changeover pin 112 and the second changeover pins 118L respectively in the first pin hole 110 and the second pin hole 116L against the biasing force of the return spring 120 disappears.

Because of this, when the base circle section in which the positions of changeover pins 112, 118L, and 118R coincide arrives, the changeover pins 112 and 118L moves in the advancing direction by the biasing force of the return spring 120, thereby returning into the valve operating state in which the first rocker arm 96 and the two second rocker arms 98 are connected via the changeover pins 112 and 118L, that is, a state in which a lift operation of the valves 58 is enabled by the acting force of the main cam 82. Moreover, as the changeover pins 112 and 118L moves in the advancing direction by the biasing force of the return spring 120, the slide pin 122 is returned from the displacement end Pmax2 to the displacement end Pmax1 via the second changeover pin 118R.

(Summary)

According to the intake variable valve operating apparatus 62 of the present embodiment thus configured, it becomes possible to switch the operational states of the valve 58 between the valve operating state and the valve closed/stopped state by moving the axial position of the slide pin 122 between the displacement end Pmax1 and the displacement end Pmax2, with the aid of the ON and OFF of the energization of the solenoid 132, the rotational force of the camshaft 80, and the biasing force of the return spring 120.

[Characteristic Control at the Time of the Stop of the Internal Combustion Engine According to the First Embodiment]

Figure 13:
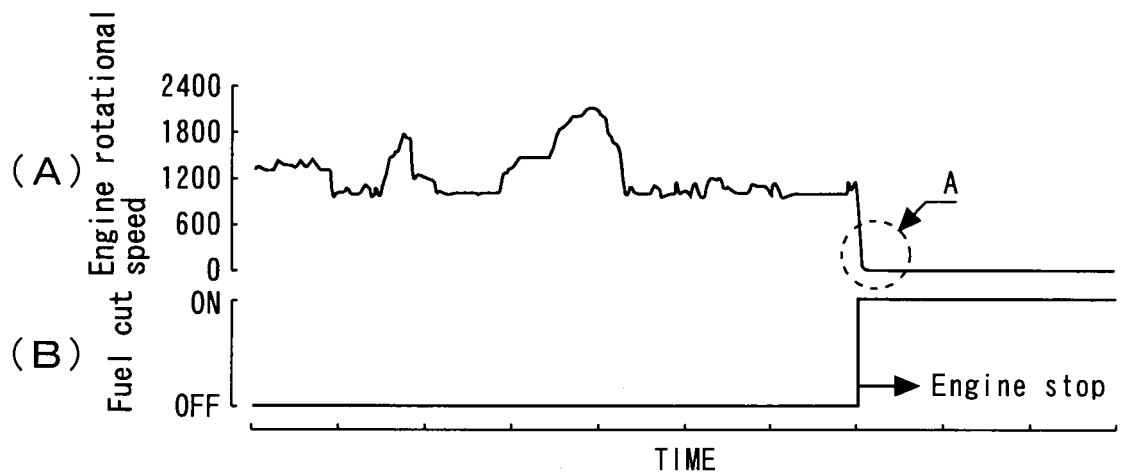
FIG. 13 is a timing chart showing the operation when the internal combustion which is in operation is stopped.

FIG. 13 is a timing chart showing the operation when the internal combustion which is in operation is stopped.

As shown in FIG. 13(B), the operation of the internal combustion engine 12 is stopped in a case in which the supply of fuel is stopped. In this case, even if the supply of the fuel into the internal combustion engine 12 is stopped, as shown in FIG. 13(A), the engine rotational speed does not immediately become zero due to the presence of inertia forces of moving parts (the crankshaft 70, the piston 42, a flywheel and the like), and the crankshaft 70 rotates for a while. Because of this, if the intake and exhaust valves 58 and 60 are being operated as normal during this time, fresh air whose oxidation concentration is high is supplied toward the catalyst 66. As a result of that, there is a concern that the degradation of the catalyst 66 arises if the temperature of the catalyst 66 is high. According to the variable valve operating apparatuses 62 and 64 described above, by energizing the solenoids 132 installed individually on the intake and exhaust side in each cylinder at the time of the stop of the internal combustion engine 12, it is possible to prevent fresh air from being supplied to the catalyst 66 in the process of stopping the internal combustion engine 12.

However, if the intake valve 58 and the exhaust valve 60 are maintained in the valve close/stopped state during the stop of the internal combustion engine 12, a load required for cranking at the next start becomes high and there is a concern that vibration occurring at the start becomes strong. Specifically, if the piston 42 of each cylinder is stopped naturally without any special consideration, the piston 42 of a certain cylinder may be stopped near the bottom dead center. In the case of the internal combustion engine 12 of a straight 4-cylinder type in the present embodiment, when the piston 42 of a certain cylinder is stopped near the bottom dead center, the piston 42 in a cylinder the phase of which is different from that of the above certain cylinder by 360 degrees in crank angle similarly comes to be stopped near the bottom dead center. In a case in which (the rotation of the crankshaft 70 of) the internal combustion engine 12 is stopped with the intake and exhaust valves 58 and 60 being maintained in the valve closed/stopped state, the air within a crankcase (not shown) flows into the combustion chamber 44 through a gap between the piston 42 and a cylinder wall surface with the time course even if the pressure in the combustion chamber 44 is negative in the beginning of the engine stop. As a result of this, the cylinder pressure approaches the atmospheric air pressure with the time course after the engine stop. Thus, if the exhaust valves 60 are maintained in the valve closed/stopped state in a situation in which the internal combustion engine 12 is started after that, the gas in the combustion chamber 44 is compressed at the exhaust stroke in a cylinder in which its piston 42 was being stopped near the bottom dead center (the explosion bottom dead center), and thereby the load required for cranking becomes high. Moreover, if the intake valves 58 the closing timings of which are usually set to a predetermined timing at the retard side of the intake bottom dead center are maintained in the valve closed/stopped state when the internal combustion engine 12 is started, in a cylinder in which its piston 42 was being stopped near the bottom dead center (the intake bottom dead center), the compression of the gas in the combustion chamber 44 is started at a timing closer to the intake bottom dead center compared to a predetermined closing timing in the valve operating state, and thereby the load required for cranking becomes high also in the case.

Furthermore, in the configuration of the variable valve operating apparatuses 62 and 64 of the present embodiment, as for a cylinder during the time period when the first rocker arm 96 is pressed by the main cam 82, the intake valves 58 or the exhaust valves 60 are not immediately returned to the valve operating state by merely stopping the energization of the solenoid 132 during the engine stop during which the camshaft 80 is not rotated. In order to return the intake valves 58 or exhaust valves 60 of all cylinders to the valve operating state, it is necessary that the base circle section of the main cam 82 arrives in each cylinder (necessary that a state in which the biasing force of the return spring 120 enables the changeover pin 112 and the like to be displaceable is produced) and, to achieve this, it is necessary to rotate the camshaft 80 by one revolution (the crankshaft 70 by two revolutions). after stopping the energization of the solenoid 132.

Figure 14:
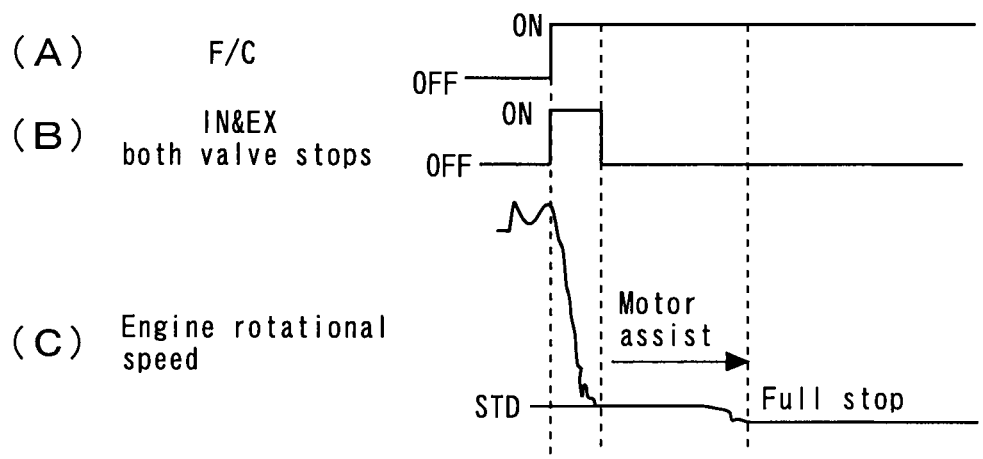
FIG. 14 is a timing chart to illustrate the control at the time of the stop of the internal combustion engine according to the first embodiment of the present invention.

Accordingly, in the present embodiment, in order to reduce the load required for the cranking at the time of the next start, while preventing fresh air from flowing into the catalyst 66 in the process of stopping the internal combustion engine 12, an arrangement is made such that the following control is performed. FIG. 14 is a timing chart to illustrate the control at the time of the stop of the internal combustion engine 12 according to the first embodiment of the present invention. To be more specific, FIG. 14(C) is an enlarged view enlarging and showing the portion near the arrow A in FIG. 13.

First, in the present embodiment, when fuel injection is stopped as shown in FIG. 14(A) in response to the establishment of a predetermined stop condition of the internal combustion engine 12, the energization of each solenoid 132 is executed to bring both of the intake and exhaust valves 58 and 60 into the valve closed/stopped state in synchronization with the execution of fuel cut (F/C). On that basis, at a timing when the engine rotational speed has decreased to a predetermined engine rotational speed STD immediately before the completion of the stop of the internal combustion engine 12, the energizations of both the solenoids 132 of the intake and exhaust sides are stopped, and the rotation of the crankshaft 70 is assisted by means of the generator (motor) 16. Moreover, the internal combustion engine 12 is fully stopped (the rotation of the crankshaft 70 is fully stopped) after rotating the camshaft 80 by one revolution (the crankshaft 70 by two revolutions) using the assist by the generator 16 (motor assist).

Moreover, in the present embodiment, when the rotation of the crankshaft 70 is fully stopped by means of the above described motor assist, the stop position of the crankshaft 70 driven by the generator 16 is adjusted in such a way that the stop position of the piston 42 of each cylinder coincides with a substantially middle position between the top dead center and the bottom dead center.

Figure 15:
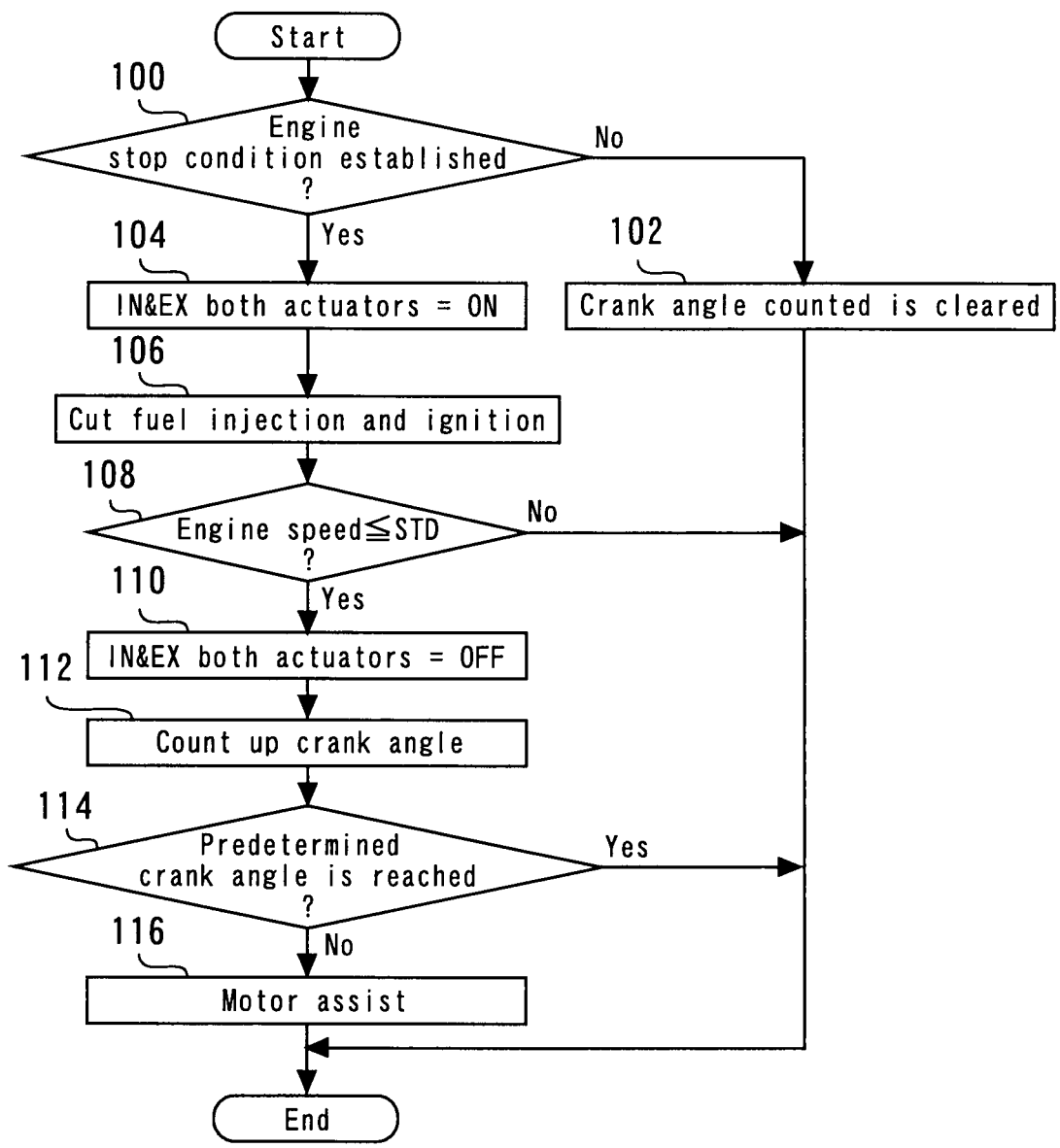
FIG. 15 is a flowchart illustrating a routine that is executed in the first embodiment of the present invention.

FIG. 15 is a flowchart showing the control routine to be executed by the ECU 40 in the present first embodiment to implement the above described function.

In the routine shown in FIG. 15, it is first determined whether or not a predetermined engine stop condition is established (step 100). As a result of this, if the engine stop condition is not established, the crank angle counted in step 110 described later is cleared (step 102).

If, on the other hand, it is determined that the engine stop condition is established in above step 100, the respective solenoids 132 (actuator 130) of the intake side and the exhaust side are energized to bring both the intake and exhaust valves 58 and 60 into the valve closed/stopped state (step 104). Next, fuel injection and ignition for each cylinder are stopped at a predetermined timing to stop the internal combustion engine 12 (step 106).

Next, it is determined whether or not the engine rotational speed is reached to the predetermined engine rotational speed STD (step 108). As a result of this, if the engine rotational speed is reached to the predetermined engine rotational speed STD, the energizations of the respective solenoids 132 (actuator 130) of the intake side and the exhaust side are stopped (step 110). Then, the crank angle from a timing when the engine rotational speed is reached to the predetermined engine rotational speed STD is counted up (step 112).

Next, it is determined whether or not the crank angle counted in above step 112 is reached to a predetermined crank angle (step 114). The predetermined crank angle in present step 114 is a crank angle, which correspond to the crank angle required for returning the intake and exhaust valves 58 and 60 of all cylinders to the valve operating state after the energization of each solenoid 132 is stopped in above step 110 (the crank angle of about two revolutions of the crankshaft 70) and at which the stop position of the piston 42 of each cylinder coincides with a substantially middle position between the top dead center and the bottom dead center when the rotation of the crankshaft 70 is fully stopped.

While it is determined in above step 114 that the crank angle counted is still not reached to the predetermined crank angle, the motor assist is executed by means of the generator 16 (step 116). If, on the other hand, it is determined that the crank angle counted is reached to the predetermined crank angle, the motor assist is ended.

According to the routine shown in FIG. 15 described so far, if the stop condition of the internal combustion engine 12 is established, fuel cut is executed in a state where both of the intake and exhaust valves 58 and 60 are in the valve closed/stopped state. Then, immediately before the completion of the stop of the internal combustion engine 12, the energizations of the respective solenoids 132 (actuator 130) of the intake side and the exhaust side are stopped, and the crankshaft 70 is rotated by means of the motor assist to rotationally drive the camshaft 80 by a rotation amount required for returning the intake and exhaust valves 58 and 60 to the valve operating state.

As described above, according to the configuration of the variable valve operating apparatuses 62 and 64 in the present embodiment, in order to return the intake valves 58 or exhaust valves 60 of all cylinders to the valve operating state, it is not enough to stop the energizations of the solenoids 132 and it is also necessary to rotate the camshaft 80 by one revolution (the crankshaft 70 by two revolutions). According to the control of the above described routine, immediately before the completion of the stop of the internal combustion engine 12, the camshaft 80 (crankshaft 70) is rotated only by a rotation amount minimally required for returning the intake and exhaust valves 58 and 60 of all cylinders to the valve operating state after the energization of each solenoid 132 is stopped. This makes it possible to prevent fresh air from flowing into the catalyst 66 in the process of stopping the internal combustion engine 12 (more specifically, during a time period until the stop of the internal combustion engine 12 is completed after the start of the fuel cut in response to the establishment of the stop condition). Further, according to the control of the above described routine, by returning the intake and exhaust valves 58 and 60 to the valve operating state at the timing of the completion of the stop of the internal combustion engine 12, the load required for cranking upon the next start can be reduced and the vibration due to the execution of the cranking can be reduced.

Moreover, according to the control of the routine described above, when the internal combustion engine 12 is fully stopped, the stop position of the crankshaft 70 driven by the generator 16 is adjusted in such a way that the stop position of the piston 42 of each cylinder coincides with a substantially immediate position between the top dead center and the bottom dead center. Such control of a crank (piston) stop position makes it possible that the piston 42 of a certain cylinder is not stopped near the bottom dead center, and thus the load required for cranking at the time of the next start can be reduced more successfully.

Meanwhile, in the first embodiment, which has been described above, the arrangement is made such that at a timing immediately before the completion of the stop of the internal combustion engine 12, the above described motor assist is performed, while the energizations of the respective solenoids 132 of the intake side and the exhaust side are stopped. However, the present invention is not limited to this. To be more specific, in a situation after the stop of the internal combustion engine 12, the energization of the above-mentioned solenoids 132 may be stopped and then the camshaft 80 (crankshaft 70) may be rotationally driven by means of the generator 16 so that the intake and exhaust valves 58 and 60 are returned to the valve operating state.

Moreover, in the first embodiment, which has been described above, the arrangement is made such that immediately before the completion of the stop of the internal combustion engine 12, the camshaft 80 (crankshaft 70) is rotationally driven using the generator 16 which the drive system 10 of a hybrid system includes. However, the camshaft drive means of the present invention is not limited to such generator 16, and may be, for example, a starter motor which a general internal combustion engine includes for starting.

Moreover, in the first embodiment, which has been described above, the arrangement is made such that when the fuel supply is stopped in response to the establishment of the predetermined stop condition of the internal combustion engine 12, each solenoid 132 is energized in order to bring both of the intake and exhaust valves 58 and 60 into the valve close and stopped state. However, in the present invention, the valve that is controlled so as to be the valve closed/stopped state when the fuel supply to the internal combustion engine is stopped in response to the establishment of the predetermined stop condition of the internal combustion engine, may be either of the intake valve 58 or the exhaust valve 60.

Further, in the first embodiment, which has been described above, the arrangement is made such that at a timing immediately before the completion of the stop of the internal combustion engine 12, the energizations of both of the solenoids 132 of the intake side and the exhaust side are stopped in order to return both of the intake and exhaust valves 58 and 60 to the valve operating state. However, in the present invention, the valve that is returned to the valve operating state during a predetermined time period immediately before the completion of the stop operation of the internal combustion engine or after the completion of the stop operation in order to reduce the load required for cranking upon the starting, may be either of the intake valve 58 or the exhaust valve 60.

Furthermore, in the first embodiment, which has been described above, the description has been made taking an example of the variable valve operating apparatuses 62 and 64 which are arranged such that the operational state of the intake valve 58 or the exhaust valve 60 is maintained in the valve close/stopped state by keeping the electrically-driven actuator 130 (solenoid 132) energized and such that the operational state of the intake valve 58 or the exhaust valve 60 is returned to the valve operating state when the camshaft 80 is rotated by about one revolution after the energization of the actuator 130 is stopped. However, the variable valve operating apparatus to be addressed in the present invention is not limited to the configuration described above, and it may be, for example, a variable valve operating apparatus having the configuration as follows, provided that the variable valve operating apparatus has an electrically-driven actuator and is configured so that the operational state of the valve becomes the valve closed/stopped state in response to a valve stop command to the actuator and so that the operational state of the valve is returned to the valve operating state when the camshaft rotates by a predetermined angle after a valve return command to the actuator is issued.

Specifically, for example, in the configuration in which a member including two types of cams (referred to as a "cam carrier") is attached to a camshaft so as to be movable in the axial direction, a valve stop actuator and a valve return actuator are provided as an electrically-driven actuator. Then, an arrangement is made such that at a position opposite to the respective actuators, a helical guide rail is provided on a peripheral surface of the above described cam carrier). Moreover, an arrangement is made such that the operational state of a valve is switched to the valve closed/stopped state when a protruding distal portion of the valve stop actuator is engaged with the guide rail in rotation for the valve stop in response to the valve stop command and the cam carrier is displaced in the axial direction of the camshaft. Furthermore, an arrangement is made such that the operational state of the valve is switched to the valve operating state when the camshaft is rotated by a predetermined angle after the protruding distal portion of the valve return actuator is engages with the guide rail for the valve return in response to the valve return command.

Alternatively, a variable valve operating apparatus having the following arrangements can be applied. To be more specific, it is arranged to adopt a method in which two types of rocker arms are switched between a connection state and a disconnection state by use of changeover pins in the same manner as the variable valve operating apparatuses 62 and 64 of the present embodiment. Then, an arrangement is made such that an electrically-driven actuator (valve stop actuator) in the present invention is provided as means for directly driving the changeover pins. Moreover, an arrangement is made such that the two types of rocker arms are put in the disconnection state when the changeover pins are displaced against the biasing force of a return spring in response to the energization of the valve stop actuator. Furthermore, an arrangement is made such that the rocker arms are put in the connection state by the changeover pins being displaced by the biasing force of the return spring when the base circle section of a main cam arrives as a result of a camshaft being rotationally driven after the energization of the valve stop actuator is stopped.

Furthermore, if a variable valve operating apparatus is provided which has a mechanism that allows the intake valves 58 and the exhaust valves 60 to be stopped independently as in the variable valve operating apparatuses 62 and 64 of the present embodiment described above, it may be arranged such that a both valve stop control which allows both of the intake valves 58 and exhaust valves 60 to be in the valve closed/stopped state and an intake side valve stop control which allows only the intake valves 58 to be in the valve closed/stopped state, in accordance with the operating region of the internal combustion engine 12 (engine rotational speed region) or the charging state of the high voltage battery 30 in the hybrid vehicle.

More specifically, if, for example, an execution request of fuel cut is issued in a high engine rotational speed region in which the engine rotational speed is equal to or higher than a predetermined engine rotational speed, it is preferable that the above mentioned both valve stop control be chosen. That is because if the intake side valve stop control is executed in the high engine rotational speed region, oil consumption increases due to the occurrence of an oil ascent by which the oil flows toward the combustion chamber 44 side from the crankcase side as a result of the inside of the combustion chamber 44 being subject to an excess negative pressure.

Moreover, if, for example, an execution request of fuel cut is issued in response to the establishment of the stop condition of the internal combustion engine 12, it is preferable that the above-mentioned intake side valve stop control be chosen. That is because if the above-mentioned both valve stop control is applied when the internal combustion engine 12 is stopped, the internal combustion engine 12 becomes hard to smoothly stop due to the fact that the vibration is likely to occur when passing through an engine resonance range near an extremely low engine rotational speed (250 rpm or so).

Furthermore, if, for example, the regenerative control (regenerative braking) at the time of deceleration in the hybrid vehicle can not be executed (if, for example, a case in which the high voltage battery 30 is in full charging condition), it is preferable that the above-mentioned intake side valve stop control be chosen. If the above mentioned both valve stop control is applied at the time of deceleration, the flow loss (pumping loss) of working gas disappears, and thereby the vehicle deceleration decreases due to a decrease of the engine brake force. In the hybrid vehicle, the engine brake force can be assisted by increasing a regenerated energy of the regenerative braking at the time of deceleration. However, if, for example, increasing the regenerated energy in a situation where the high voltage battery 30 is in full charging condition provokes some problems such as heat generation and degradation of the high voltage battery 30. Because of this, it is preferable in this case that the above described intake side stop control be chosen to secure the engine brake force.

It is noted that in the first embodiment, which has been described above, the actuator 130 having the solenoid 132 corresponds to the "electrically-driven actuator" according to the above described first aspect of the present invention and the "valve stop actuator" according to the above described second aspect of the present invention, respectively. Moreover, the "valve stop command means" according to the above described first aspect of the present invention is implemented by the ECU 40 executing the processing of above described step 104; the "valve return command means" according to the above described first aspect of the present invention is implemented by the ECU 40 executing the processing of above described step 110; and the "camshaft drive means" according to the above described first aspect of the present invention and the "crankshaft drive means" according to the above described fourth aspect of the present invention are implemented by the ECU 40 executing the processing of above described steps 112 to 116, respectively.

Second Embodiment

Next, a second embodiment of the present invention will be described with reference to FIG. 16.

The system of the present embodiment can be implemented by using the hardware configuration shown in FIG. 1 and causing the ECU 40 to execute the routine shown in FIG. 16 described below, instead of the routine shown in FIG. 15.

If the control at the time of the stop in the above described first embodiment allows the intake valves 58 to be opened at the time of the completion of the stop of the internal combustion engine 12, fresh air comes to be taken into the combustion chamber 44 during the engine stop. As a result of this, the fresh air flows into the catalyst 66 when the cranking is performed at the time of the next stop. In this reason, there is a concern that if the catalyst 66 is maintained in a high temperature state at the time of the next stop, the degradation of the catalyst 66 arises.

Accordingly, in the present embodiment, an arrangement is made such that after the internal combustion is stopped with both of the intake and exhaust valves 58 and 60 being put in the valve closed/stopped state, it is determined whether or not the temperature of the catalyst 66 is equal to or less than a predetermined temperature. Then, an arrangement is made such that when the temperature of the catalyst 66 is decreased to the predetermined temperature or so during the stop of the internal combustion engine 12, the energizations of the respective solenoids 132 of the intake side and exhaust side are stopped and the camshaft 80 (crankshaft 70) is rotationally driven by means of the generator 16, in order to return the intake and exhaust valves 58 and 60 to the valve operating state.

Figure 16:
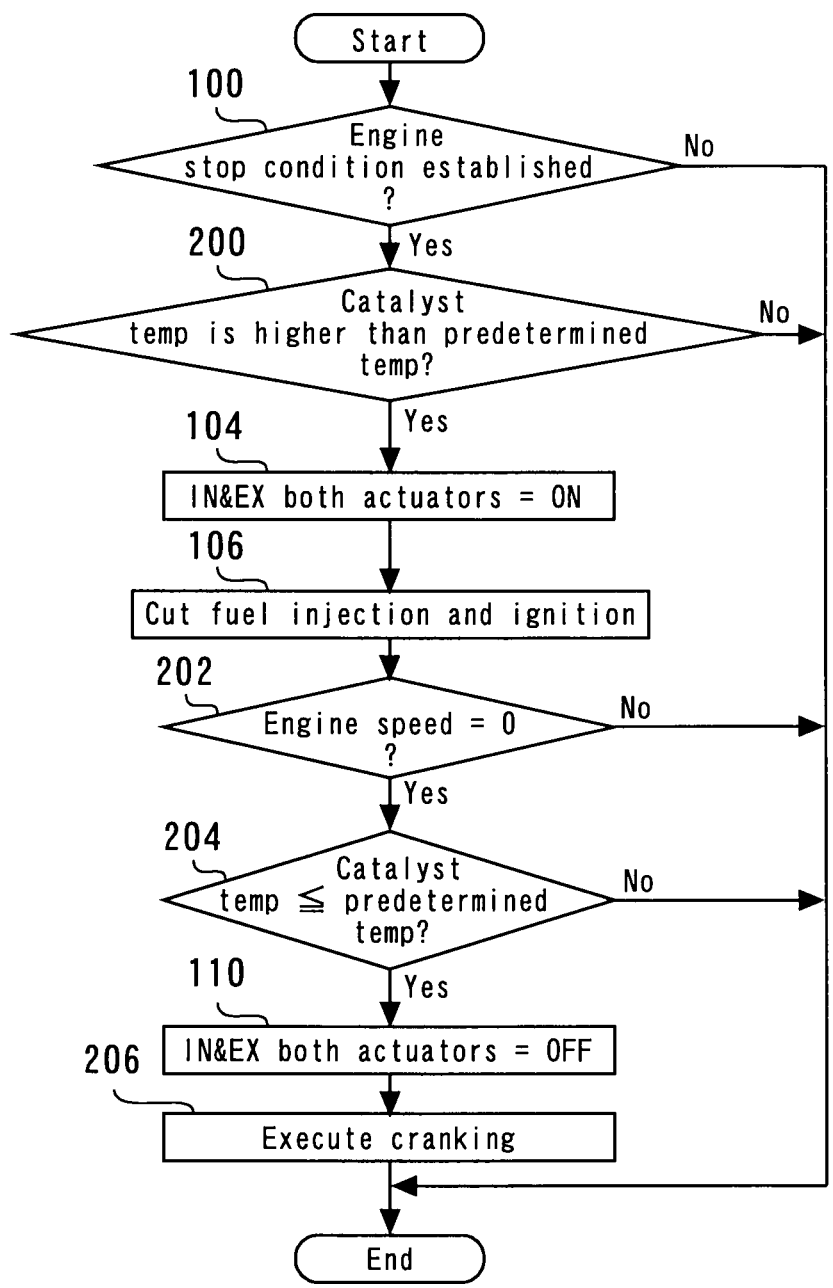
FIG. 16 is a flowchart illustrating a routine that is executed in the second embodiment of the present invention.

FIG. 16 is a flowchart showing the control routine to be executed by the ECU 40 in the present second embodiment to implement the above described function. It is noted that in FIG. 16, the same steps as those in FIG. 15 in the first embodiment will be assigned with the same reference numerals and the descriptions therefor will be omitted or simplified.

In the routine shown in FIG. 16, if it is determined in above step 100 that the engine stop condition is established, it is determined whether or not the temperature of the catalyst 66 is higher than a predetermined temperature (step 200). The predetermined temperature in present step 200 is previously set as a threshold value for judging whether or not there is a situation where the degradation of the catalyst 66 is a concern due to the inflow of the fresh air into the catalyst 66.

If it is determined in above step 200 that the temperature of the catalyst 66 is higher than the above mentioned predetermined temperature, it is determined whether or not the engine rotational speed has become zero after the energizations of the respective solenoids 132 of the intake side and exhaust side (step 104) and the execution of the fuel injection and the ignition (step 106) are performed (step 202).

As a result of that, if it is determined that the engine rotational speed has become zero, it is determined whether or not the temperature of the catalyst 66 is equal to or less than the predetermined temperature (step 204). As a result of this, if the determination of present step 204 is established during the stop of the internal combustion engine 12, the energizations of the respective solenoids 132 are stopped in above step 110 and then the cranking is executed (step 206). According to the cranking in present step 206, the crankshaft 70 is rotationally driven using the generator 16 by the crank angle required for returning the intake and exhaust valves 58 and 60 of all cylinders to the valve operating state (the crank angle of about two revolution of the crankshaft 70). Moreover, the cranking in this case is performed in such a way that the crankshaft 70 is stopped at the crank angle when the stop position of the piston 42 of each cylinder coincides with a substantially middle position between the top dead center and the bottom dead center.

According to the routine shown in FIG. 16 described so far, only if the temperature of the catalyst 66 has fallen below the predetermined temperature during the stop of the internal combustion engine 12 (that is to say, only if there is no concern of degradation of the catalyst 66), the energizations of the respective solenoids 132 of the intake side and exhaust side and the camshaft 80 (crankshaft 70) is rotationally driven by means of the generator 16 are stopped, in order to return the intake and exhaust valves 58 and 60 to the valve operating state. Such control makes it possible to additionally attempt to suppress the degradation of the catalyst 66 at the time of the start, while achieving the suppression of degradation of the catalyst 66 by preventing the fresh air from flowing into the catalyst 66 in the process of stopping the internal combustion engine 12, and the reduction of the load required for cranking at the time of the next start.

It is noted that in the second embodiment, which has been described above, the "catalyst temperature acquisition means" according to the above described third aspect of the present invention is implemented by the ECU 40 executing the processing of above described step 204.

The invention claimed is:

1. A control apparatus for an internal combustion engine, the apparatus comprising:
   a variable valve operating apparatus which is capable of changing an operational state of at least one of an intake valve and an exhaust valve between a valve operating state and a valve closed/stopped state, has an electrically-driven actuator, and is configured so that the operational state of the at least one of the valves becomes the valve closed/stopped state in response to a valve stop command to the actuator and so that the operational state of the at least one of the valves is returned to the valve operating state when a camshaft rotates by a predetermined angle after a valve return command to the actuator is issued;
   valve stop command means for issuing the valve stop command to the actuator so that the operational state of the at least one of the valves becomes the valve closed/stopped state when fuel supply to the internal combustion engine is stopped in response to an establishment of a predetermined stop condition of the internal combustion engine;
   valve return command means for issuing the valve return command to the actuator so that the operational state of the at least one of the valves is returned to the valve operating state during a predetermined time period immediately before a completion of a stopping operation of the internal combustion engine or after a completion of the stopping operation; and
   camshaft drive means for rotationally driving the camshaft by the predetermined angle required to return the operational state of the at least one of the valves to the valve operating state at or after a time point when the valve return command is issued by the valve return command means.

2. The control apparatus for an internal combustion engine according to claim 1,
   wherein the actuator is a valve stop actuator which is used for changing the operational state of the at least one of the valves to the valve closed/stopped state,
   wherein the variable valve operating apparatus is configured so that the operational state of the at least one of the valves is maintained in the valve closed/stopped state by keeping the valve stop actuator energized and so that the operational state of the at least one of the valves is returned to the valve operating state when the camshaft is rotated by a predetermined angle after the energization of the valve stop actuator is stopped,
   wherein the valve stop command means issues an energization command to the valve stop actuator as the valve stop command, and
   wherein the valve return command means issues an energization stop command to the valve stop actuator.

3. The control apparatus for an internal combustion engine according to claim 1,
   wherein the apparatus further comprises catalyst temperature acquisition means for acquiring a temperature of a catalyst disposed in an exhaust passage of the internal combustion engine, and
   wherein the valve return command means issues the valve return command when the temperature of the catalyst becomes equal to or lower than a predetermined temperature during a stop of the internal combustion engine.

4. The control apparatus for an internal combustion engine according to claim 1, wherein the camshaft drive means is crankshaft drive means for rotationally driving a crankshaft of the internal combustion engine to rotationally drive the camshaft, and wherein when the internal combustion engine is stopped in response to the establishment of the stop condition, the crankshaft drive means rotationally drives the crankshaft so that the crankshaft is stopped at a timing at which a piston of each cylinder is in a substantially middle position between a top dead center and a bottom dead center.

5. A control apparatus for an internal combustion engine, the apparatus comprising:

a variable valve operating apparatus which is capable of changing an operational state of at least one of an intake valve and an exhaust valve between a valve operating state and a valve closed/stopped state, has an electrically-driven actuator, and is configured so that the operational state of the at least one of the valves becomes the valve closed/stopped state in response to a valve stop command to the actuator and so that the operational state of the at least one of the valves is returned to the valve operating state when a camshaft rotates by a predetermined angle after a valve return command to the actuator is issued;

a valve stop command unit which issues the valve stop command to the actuator so that the operational state of the at least one of the valves becomes the valve closed/stopped state when fuel supply to the internal combustion engine is stopped in response to an establishment of a predetermined stop condition of the internal combustion engine;

a valve return command unit which issues the valve return command to the actuator so that the operational state of the at least one of the valves is returned to the valve operating state during a predetermined time period immediately before a completion of a stopping operation of the internal combustion engine or after a completion of the stopping operation; and a camshaft drive unit which rotationally drives the camshaft by the predetermined angle required to return the operational state of the at least one of the valves to the valve operating state at or after a time point when the valve return command is issued by the valve return command unit.

6. The control apparatus for an internal combustion engine according to claim 5, wherein the actuator is a valve stop actuator which is used for changing the operational state of the at least one of the valves to the valve closed/stopped state, wherein the variable valve operating apparatus is configured so that the operational state of the at least one of the valves is maintained in the valve closed/stopped state by keeping the valve stop actuator energized and so that the operational state of the at least one of the valves is returned to the valve operating state when the camshaft is rotated by a predetermined angle after the energization of the valve stop actuator is stopped, wherein the valve stop command unit issues an energization command to the valve stop actuator as the valve stop command, and wherein the valve return command unit issues an energization stop command to the valve stop actuator.

7. The control apparatus for an internal combustion engine according to claim 5, wherein the apparatus further comprises catalyst temperature acquisition unit which acquires a temperature of a catalyst disposed in an exhaust passage of the internal combustion engine, and wherein the valve return command unit issues the valve return command when the temperature of the catalyst becomes equal to or lower than a predetermined temperature during a stop of the internal combustion engine.

8. The control apparatus for an internal combustion engine according to claim 5, wherein the camshaft drive unit is crankshaft drive unit which rotationally drives a crankshaft of the internal combustion engine to rotationally drive the camshaft, and wherein when the internal combustion engine is stopped in response to the establishment of the stop condition, the crankshaft drive unit rotationally drives the crankshaft so that the crankshaft is stopped at a timing at which a piston of each cylinder is in a substantially middle position between a top dead center and a bottom dead center.

* * * * *